H. P. HOOD.
Nut-Locks.

No. 146,532.

Patented Jan. 20, 1874.

Witnesses:
George W. Joseph
A. W. Hibberd

Inventor;
Harrison P. Hood.

UNITED STATES PATENT OFFICE.

HARRISON P. HOOD, OF INDIANAPOLIS, INDIANA.

IMPROVEMENT IN NUT-LOCKS.

Specification forming part of Letters Patent No. 146,532, dated January 20, 1874; application filed December 31, 1873.

*To all whom it may concern:*

Be it known that I, HARRISON P. HOOD, of Indianapolis, State of Indiana, have invented an Improvement in Nut-Locks, of which the following is a specification:

The object of my invention is to improve a nut-lock invented by myself and William Coombs, of Bangor, State of Maine, for which Letters Patent of the United States were issued, numbered 135,553, and dated February 4, 1873.

Figure 1:
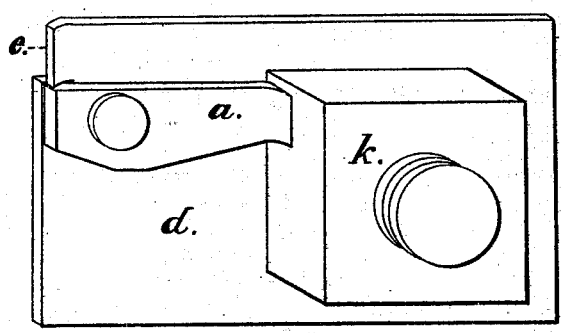

Figure 1 in the accompanying drawings is a perspective view of the said Hood and Coomb's invention applied to one of the nuts on a splice-bar bolt. In this device a portion of the washer $d$ is turned up slightly at $e$, thus forming a rigid stop, which prevents the button $a$ from falling below the proper position for holding the nut $k$.

Figure 2:
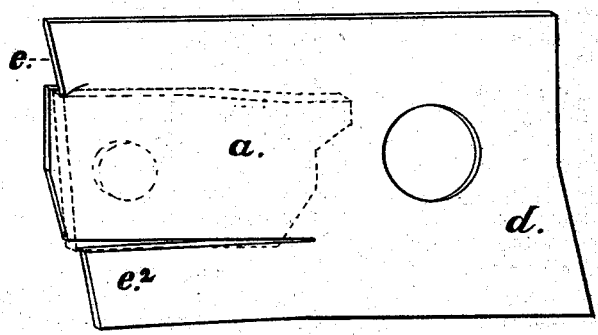

Fig. 2 is a view of my improvement, which consists in forming a second stop, $e^2$, which, instead of being rigid like the stop $e$, is made with a spring, so that it can be easily forced down flush with the surface of the washer $d$, and, on being released, will raise itself above the surface of the washer. The object of this spring-stop $e^2$ is to lock the button $a$ (shown in dotted lines in Fig. 2) when it is in position for holding the nut, the button being held between the stops $e$ and $e^2$. It is objected to, in the device as shown in Fig. 1, that the button $a$ is liable to be accidentally raised by the heavy jarring of passing trains, or otherwise, and also that it must be kept in an upright position, so that the force of gravitation will operate to keep the button in place when holding the nut, thus limiting its use to such places as its functions will not be disturbed by the force of gravitation.

With my improvement it is impossible to displace the button, and thus release the nut, except designedly, without regard to the force of gravitation, thus greatly increasing the security of the lock, and extending the field of its usefulness.

Figure 3:

Fig. 3 is an end view.

I claim as my invention—

The spring-stop $e^2$, in combination with the button $a$ and rigid stop $e$, for the purpose herein set forth.

HARRISON P. HOOD.

Witnesses:
 GEORGE W. JOSEPH,
 AARON W. HIBBERD.